United States Patent [19]
Gewecke

[11] Patent Number: 5,165,646
[45] Date of Patent: Nov. 24, 1992

[54] AUTO DASHBOARD DRINK CONDITIONER

[76] Inventor: Danny F. Gewecke, 3938 Orange Ave., Covina, Calif. 91722

[21] Appl. No.: 772,456

[22] Filed: Oct. 7, 1991

[51] Int. Cl.$^5$ ............................................. F16M 13/00
[52] U.S. Cl. .................................. 248/311.2; 62/244; 165/80.1; 224/42.45 R
[58] Field of Search ............... 248/311.2, 231.7, 689; 224/42.45 R; 62/244, 457.3, 457.4, 457.5; 165/80.1, 41

[56] References Cited

U.S. PATENT DOCUMENTS

| | | | |
|---|---|---|---|
| 3,916,639 | 11/1975 | Atkinson | 62/244 X |
| 4,597,435 | 7/1986 | Fosco, Jr. | 62/457.4 X |
| 4,852,843 | 8/1989 | Chandler | 248/311.2 |
| 4,892,137 | 1/1990 | Bibik, Jr. | 62/244 X |
| 4,892,138 | 1/1990 | Bibik, Jr. | 62/244 X |
| 4,936,103 | 6/1990 | Newman | 62/244 X |

*Primary Examiner*—David L. Talbott
*Attorney, Agent, or Firm*—William H. Maxwell

[57] ABSTRACT

A food and beverage conditioner attachment to auto dashboards, wherein a walled body forms a plenum chamber receiving food and beverage containers exposed therein to the discharge of air conditioner air flowing freely therethrough and into the passenger compartment.

14 Claims, 2 Drawing Sheets

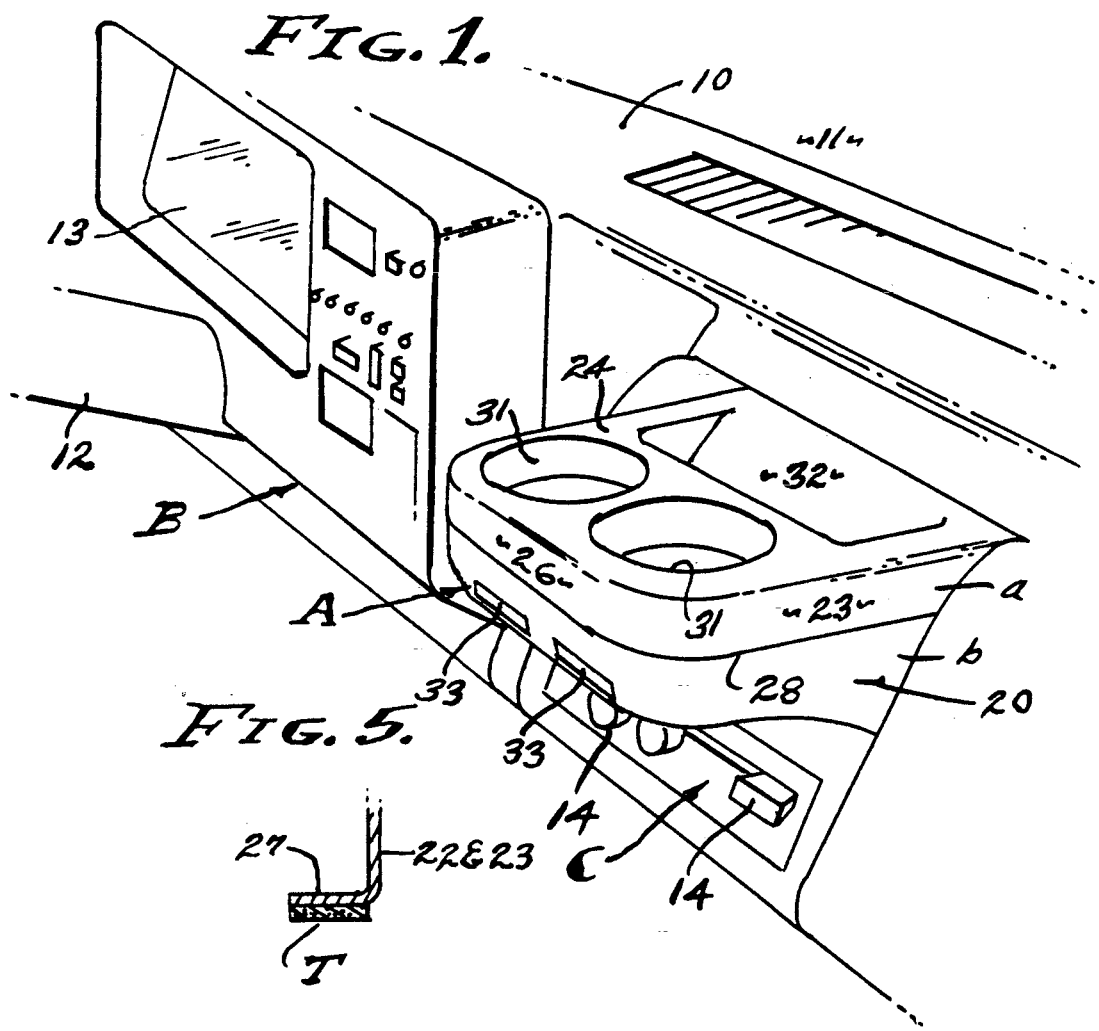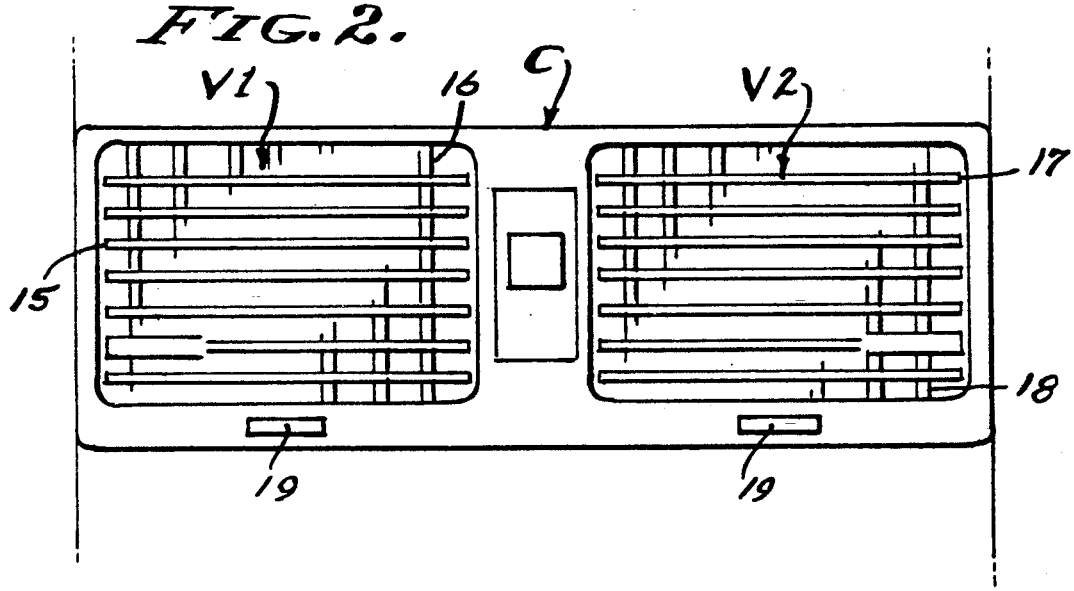

AUTO DASHBOARD DRINK CONDITIONER

BACKGROUND OF THE INVENTION

This invention relates to a convenience attachment to automotive dashboards, for the securement of drinking cups or glasses in accessible position, while tempering the same within a desirable temperature range.

The handling of drinks in a moving vehicle is usually an awkward situation and most often results in spills because of swerving and accelerating or decelerating of the vehicle. The driver is particularly prone to experience spills since his attention is to driving, and even a passenger experiences spills because of unexpected movements. The usual protection against spills is to carefully hold the cup or glass containing a liquid, but this is not practical for extended periods of time, there being no adequate place to support a drinking cup or glass in the usual vehicle cabin, especially at or next to the driver's position. That is, the dashboard of a vehicle is devoted to controls related to vehicle functions, there being no provision for and/or no refreshment facilities. Accordingly, it is an object of this invention to provide a dashboard attachment for the support of beverage or food cups or glasses.

Beverages are served either hot or cold; for example hot tea, coffee or chocolate, or cold iced-tea, shakes, fruit juices and soft drinks. And, when these beverages, or foods, are exposed to the surrounding ambient air they soon lose their original temperature condition, and consequently become undesirable. It is the difference between the desirable beverage temperature (hot or cold) and the surrounding ambient air temperature with which this invention is concerned, because of the transfer of heat energy that occurs when interface contact therebetween occurs. In the case of a cup of hot beverage served just below boiling (less than 212° F.), its interface contact with surrounding ambient air at 70°-80° F. presents a temperature differential that quickly drains off the heat energy therein. Conversely, in the case of a glass of cold beverage served somewhat above freezing (more than 32° F.), its interface contact with surrounding ambient air at 70°-80° F. presents a temperature differential that quickly replaces heat energy thereto. The ambient air temperature will of course vary and is at a high differential as stated above.

Fully equiped automotive vehicles include heating and air conditioning refrigeraton. The heat source for the conventional auto heater is the excess heat derived from the internal combustion engine, a heat engine, whereas the cold source is conventionally derived from mechanical refrigeration, all of which is well developed prior art. The heat source in a liquid cooled engine reaches a boiling temperature of 212° (greater when pressured), while refrigeration air approaches a freezing temperature of 32° F. The temperature examples given are extreme and are not expected to prevail under usual working conditions, it being an object of this invention to apply these heat sources to the beverage support attachment herein disclosed.

The present day automotive dashboard is provided with heater and air conditioner vents located centrally between the driver and the front passenger. These vents are universally provided as a pair of vents, one for the driver's comfort and the other for the passenger's comfort. A typical pair of vents occupy a nine inch width and three inch height, provided with controlling louvers that direct air to discharge horizontally and vertically. When practicing this invention, the air discharge is straight rearward on parallel axes. It is to be understood that this system can be operated in either the heat or the refrigeration mode and at whatever intensity thereof which may be desired within its capacity, it being an object of this invention to provide a plenum for receiving and discharging heater or refrigeration air and in which the beverage cups or glasses are exposed for heat transfer. Accordingly, the heat differential between the beverage and conditioned air is controlling, to the exclusion of air within the vehicle cabin. That is, when a hot drink is supported in the plenum the heater mode is implemented, and when a cold drink is supported in the plenum the refrigeration mode is implemented.

The facia of the auto dashboards are very much alike, and to which people are well accustomed, so that application of this attachment can be readily made to those vehicles that vary little if all. Consequently, a vehicle dashboard and/or the attachment need be modified only slightly if at all, and readily applied or removed. However, a permanent installation may be desired.

SUMMARY OF THE INVENTION

Fast foods and beverages are consumed from expendable containers or vessels of plastic and treated paper, or the like, but not to exclude reuseable cups and glasses. Regardless of the type of container, they are conductive to radiating and absorbing heat energy. Consequently, there is heat energy transfer between the contained food or beverage and the surrounding air in contact therewith and with the exterior of the container. The usual and well equiped automotive vehicle has a heater and a refrigeration air conditioner, and it is these heat supplying and extracting sources that this invention advantageously employs to condition prepared foods and beverages. An attachment is provided for the support of containers and for the capture of conditioned air from said sources hot or cold, with a plenum chamber in which the containers are exposed for heat transfer. By subjecting the food or beverage container to hot air within the plenum chamber, a heated condition is sustained. And, by subjecting the food or beverage containers to cold air within the plenum chamber, a cold condition is sustained.

The foregoing and various other objects and features of this invention will be apparent and fully understood from the following detailed description of the typical preferred form and application thereof, throughout which description reference is made to the accompanying drawings.

THE DRAWINGS

FIG. 1 is a perspective view showing the drink conditioner attachment of the present invention mounted to the dashboard of an automotive vehicle.

FIG. 2 is an elevational view showing a section of the dashboard to which the drink conditioner is mounted, illustrating the heater and air conditioner vents and usual controls therefor.

Figure 4:
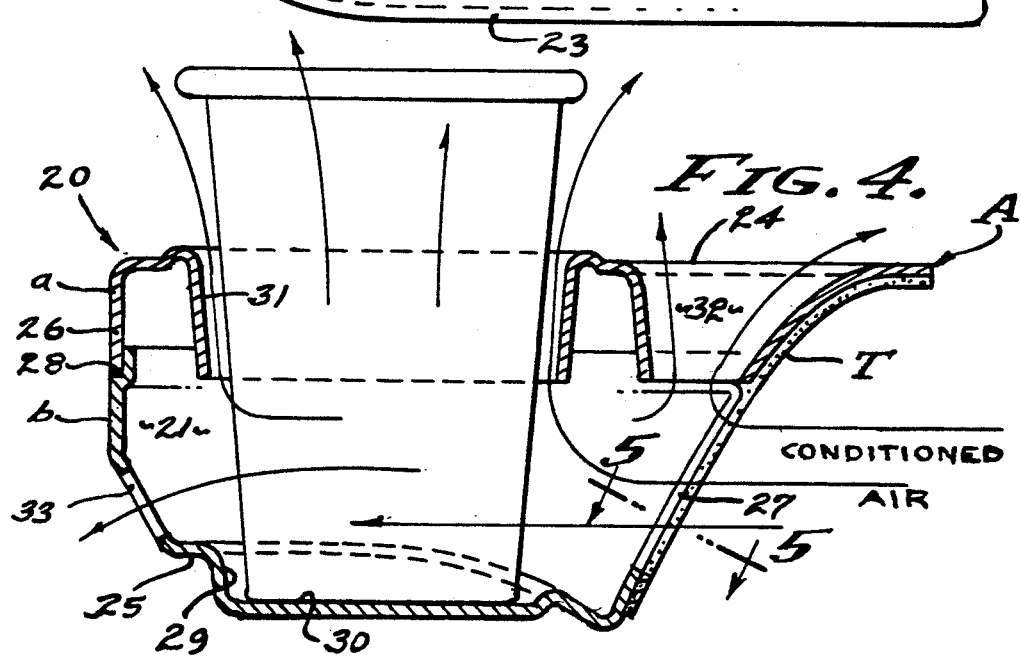
FIG. 4 is a sectional view through the attachment, taken as indicated by line 4—4 on FIG. 3, illustrating the exposure of a food or beverage container, a cup, supported within the plenum that captures the discharge of conditioned air.

And, FIG. 5 is a fragmentary sectional view taken as indicated by line 5—5 on FIG. 4.

PREFERRED EMBODIMENT

Referring now to the drawings, the dashboard attachment A is a food and beverage container support, providing a container support adapted to cooperate with a functioning heater and/or air refrigeration means to condition the contents of the cup. Accordingly, and as best illustrated in FIG. 1 of the drawings, a vehicle dashboard B is comprised of a transverse cowling 10 beneath a wind screen 11, and to one side of which is a steering column 12 over which there in an instrument panel 13. Centrally located within the vehicle cabin the dashboard has an air conditioner section C including heater and refrigeration controls 14 and characterized by air discharge vents V1 and V2. As shown in FIG. 2, the left side vent V1 services the driver with adjustable vertical and horizontal louvers 15 and 16 directing air discharge and may be required, and the right side service to the passenger with adjustable louvers 17 and 18. As stated above, these louvers are set straight when implementing the drink conditioner attachment disclosed herein. Beneath the vents are the heater and air refrigeration controls 19.

As shown throughout the drawings the attachment A is a walled body 20 open to and forming a plenum chamber 21 overlying the vents V1 and V2. There is at least one such vent over which the body B is mounted, and such that conditioned air is discharged freely into and through the plenum chamber 21, without undue restriction. The body design can vary and is shown as comprised of opposite side walls 22 and 23 extending between top and bottom walls 24 and 25, and closed by a front wall 26. The back is typically open. The top wall 24 is horizontally disposed, as is the bottom spaced downwardly therefrom. The front wall 26 is spaced from and parallel to the front of the dashboard B. Accordingly, the space within the spaced walls 22-26 defines the plenum 21 coextensive generally with at least one air discharge vent and preferably with the pair of right and left vents, as shown. In practice, there is a partial back wall 27 (see FIG. 4) to interface with the front face of the air conditioner section C of the dashboard B.

Securement means for the body 20 to the front face of the air conditioner section C is by means of double sided tape T, or by screw fastener means, or it can be pinned and/or hooked into place. As shown in FIG. 5 of the drawings, the partial back wall 27 is an inturned flange at each side wall 22 or 23, to interface with the front face of the dashboard B as it is shown mounted thereto in FIG. 1.

The body 20 is shown as it is made of vacuum formed plastic, comprised of top and bottom sections a and b joined by a solvent or cement at an overlapping joint 28. It is to be understood that the body 20 can be fabricated of other suitable materials, or formed as for example by injection molding.

The container support is by means of the bottom section b and its bottom wall 25 (see FIG. 4). In practice, there is a container support for each of the front seat occupants of the vehicle, in which case a receptacle 29 is provided right and left for each of two container cups as shown. It is to be understood that at least one container or a multiplicity thereof is accomodated in this drink conditioning attachment, characterized by a horizontal surface 30 to interface with the flat bottom of the container. In practice, the bottom 25 and at least one receptacle 29 formed therein is imperforate so as to capture and contain accidental spills and drippings.

Positioning of the container cup as shown is by means of an oversized opening 31 in the top wall 24, to receive and guide the container into supporting engagement in the receptacle 29. Accordingly, the opening 31 is in vertical axial alignment with the receptacle 29, the opening and receptacle being of round configuration larger in diameter than that of the round container that is to be postioned and supported with its lower side wall portion exposed within the plenum chamber 21. The oversized opening 31 defines an annulus around the container and through which conditioned air discharges as is indicated by arrows in FIG. 4. The discharged air through said annulus then effectively flows over the upper side wall portion of the container as is also indicated. Thus, the entire outside surface of the container cup as shown is subjected to interface contact with conditioned air for heat transfer as may be required (for heating or cooling).

Figure 3:
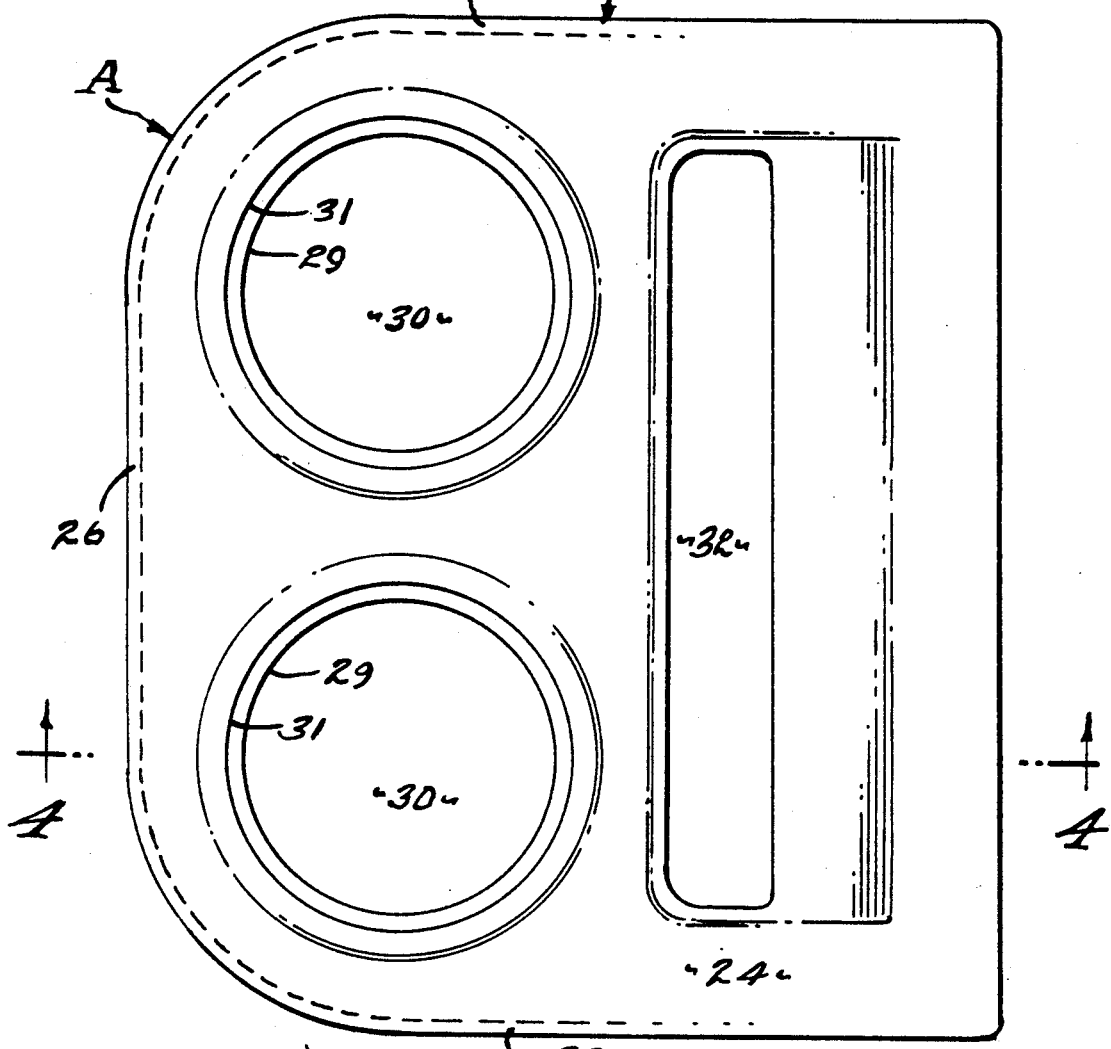
FIG. 3 is a plan view of the drink conditioner attachment shown in FIG. 1.

Air conditioning of the vehicle cabin is not neglected, and to this end supply air is discharged from the plenum 21 upwardly over the cowling 10 and windscreen 11 by means of a transverse relief air vent 32 that follows the front face contour of the dashboard B, and disposed between the partial back wall 27 and the container and opening 31 (see FIG. 3), in order to ensure flow over the lower portion of the container or containers, air is also discharged from the plenum 31 after flowing around them, by means of a transverse relief air vent 33 through the front wall 26. The open relief air vents 32 and 33 ensure free flow of conditioned air so that the blower system supplying said air will not stall and will therefore operate efficiently.

From the foregoing it will br understood that I have provided an attachment that is readily mounted to the dashboard of a vehicle, whereby the air conditioning system is advantageously employed to condition food and beverage containers, either to sustain their heated or refrigerated condition. The size of container and its shape can vary widely without adverse effect upon the air conditioning functions within the vehicle cabin, since free flow of discharged air is ensured, with or without the presence of said containers within the attachment.

Having described only the typical preferred forms and applications of my invention, I do not wish to be limited or restricted to the specific details herein set forth, but wish to reserve to myself any modifications or variations that may appear to those skilled in the art, as set forth within the limits of the following claims.

I claim:

1. An auto dashboard drink container conditioner for attachment over an air conditioner vent discharging from said dashboard, and including;
    a walled body forming a plenum chamber open to the air conditioner vent and with at least one relief air vent for free discharge of a greater portion of the conditioner air from the air conditioner vent,
    at least one container support positioned in the plenum chamber for support of a drink container therein exposed to a lesser portion of the conditioner air discharge within and from an opening through said plenum chamber surrounding the drink container, and securement means for attachment of said walled body to the auto dashboard and over and open to said air conditioner vent.

2. The dashboard drink container conditioner as set forth in claim 1, wherein the at least one relief air vent is an opening in a wall of the walled body.

3. The dashboard drink container conditioner as set forth in claim 1, wherein the at least one relief air vent is an opening in a front wall of the walled body.

4. The dashboard drink container conditioner as set forth in claim 1, wherein the at least one relief air vent is an opening in a top wall of the walled body and between the air conditioner vent and plenum chamber.

5. The dashboard drink container conditioner as set forth in claim 1, wherein the container support is a bottom wall of the walled body.

6. The dashboard drink container conditioner as set forth in claim 1, wherein the container support is an imperforate bottom wall of the walled body, for receiving a liquid spill.

7. The dashboard drink container conditioner as set forth in claim 1, wherein the at least one relief air vent is an opening in a top wall of the walled body and between the air conditioner vent and plenum chanber, and wherein the container support is an imperforate bottom wall of the walled body for receiving a liquid spill.

8. An auto dashboard drink container conditioner for attachment over horizontally spaced air conditioner vents discharging rearwardly from said dahsboard, and including;
  a walled body forming a plenum chamber open to the air conditioner vent and with relief air vents for free discharge of a greater portion of the conditioner air from the air conditioner vent and through the plenum chamber,
  a pair of horizontally spaced container supports positioned in the plenum chamber in rearward alignment with the spaced air conditioner vents for support of a pair of drink containers therein exposed to a lesser portion of the conditioner air for heat transfer from air discharge within and from a pair of openings through said plenum chamber surrounding the drink containers.

9. The dashboard drink container conditioner as set forth in claim 8, wherein relief air vent openings are in a wall of the walled body.

10. The dashboard drink container conditioner as set forth in claim 8, wherein relief air vent openings are in a front wall of the walled body.

11. The auto dashboard drink container as set forth in claim 8, wherein a "the" relief air vent opening is in a top wall of the walled body and between the air conditioner vent and plenum chamber.

12. The dashboard drink container conditioner as set forth in claim 8, wherein the container supports are a bottom wall of the walled body.

13. The dashboard drink container conditioner as set forth in claim 8, wherein the container supports are an imperforate bottom wall of the walled body, for receiving a liquid spill.

14. The dashboard drink container conditioner as set forth in claim 8, wherein a relief air vent opening is in a top wall of the walled body and between the air conditioner vent and plenum chamber, and wherein the container supports are in an imperforate bottom wall of the walled body for receiving liquid spills.

* * * * *